United States Patent
Wang et al.

(10) Patent No.: US 7,174,374 B2
(45) Date of Patent: Feb. 6, 2007

(54) MULTI-PRIORITY MEDIA ACCESS CONTROL METHOD FOR MULTI-CHANNEL SLOTTED RING NETWORKS

(75) Inventors: Jun-Yao Wang, Chiayi (TW); Wen-Shyang Hwang, Kaohsiung Hsien (TW); Wen-Fong Wang, Kaohsiung (TW); Ce-Kuen Shieh, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 676 days.

(21) Appl. No.: 10/142,794

(22) Filed: May 13, 2002

(65) Prior Publication Data

US 2003/0212812 A1 Nov. 13, 2003

(51) Int. Cl.
*G06F 15/173* (2006.01)

(52) U.S. Cl. .............. 709/223; 709/224; 709/238; 370/230; 370/400

(58) Field of Classification Search ........ 709/223–224, 709/238; 370/230, 400, 412, 418, 447–448, 370/468, 222, 238, 255, 352–353, 392–393, 370/474, 471
See application file for complete search history.

(56) References Cited

U.S. PATENT DOCUMENTS

| | | | | |
|---|---|---|---|---|
| 4,680,757 A | * | 7/1987 | Murakami et al. | 370/455 |
| 4,914,650 A | * | 4/1990 | Sriram | 370/235 |
| 4,933,935 A | * | 6/1990 | Adams | 370/406 |
| 5,402,422 A | * | 3/1995 | Liu et al. | 370/443 |
| 5,453,987 A | * | 9/1995 | Tran | 370/447 |
| 5,553,072 A | * | 9/1996 | Daggett et al. | 370/447 |
| 5,631,906 A | * | 5/1997 | Liu | 370/455 |
| 5,764,392 A | * | 6/1998 | Van As et al. | 398/79 |
| 5,966,163 A | * | 10/1999 | Lin et al. | 725/117 |
| 6,256,317 B1 | * | 7/2001 | Holloway et al. | 370/447 |
| 6,463,071 B1 | * | 10/2002 | Araujo et al. | 370/437 |
| 6,467,091 B1 | * | 10/2002 | Lin et al. | 725/126 |
| 6,584,089 B1 | * | 6/2003 | Honkasalo et al. | 370/338 |
| 6,614,805 B1 | * | 9/2003 | Raahemi et al. | 370/468 |
| 6,768,738 B1 | * | 7/2004 | Yazaki et al. | 370/392 |

* cited by examiner

*Primary Examiner*—Arid Etienne
*Assistant Examiner*—LaShonda Jacobs
(74) *Attorney, Agent, or Firm*—Bacon & Thomas, PLLC

(57) ABSTRACT

The present invention discloses a multi-priority media access control method for a multi-channel slotted ring network. In the slotted ring networks, each node has one tunable transmitter and one fixed receiver for data channels, and is able to inspect slot status on all channels. The header slot format defines the slot priorities on ring networks and limits which packets can be transmitted through the slots. By assigning slot priority based on two thresholds to raise and lower slot priority, multiple priority packets can be transmitted.

8 Claims, 4 Drawing Sheets

MULTI-PRIORITY MEDIA ACCESS CONTROL METHOD FOR MULTI-CHANNEL SLOTTED RING NETWORKS

BACKGROUND OF THE INVENTION

1. Field of the Invention

The present invention relates to the field of multi-channel slotted ring networks and, more particularly, to a multi-priority Media Access Control (MAC) method for a multi-channel slotted ring network, such as the Wavelength Division Multiplexing (WDM) slotted ring network.

2. Description of Related Art

In optical networks, WDM technology provides one means to utilize the potentially huge fiber optic bandwidth, WDM is generally used to divide fiber optic bandwidths into a number of channels whose rates match the speeds of the electronic interface. Clearly, a network explored by WDM technology is a multiple channel network.

Because of the huge bandwidth of WDM technology, many efforts based on this technology are made to provide new transmission protocols on different topologies, such as ring, star, tree and mesh. Among these topologies, the ring topology is commonly used in access networks and metropolitan area networks (MANs).

Nowadays, since the Internet is in widespread use, the types of network applications are diverse. A noticeable application is the transmission of multimedia or real-time data, such as video or voice data. In order to let the transmission of real-time data satisfy its deadline, the transmission priority of real-time data must be higher than the priority of non real-time data. The transmission protocols of multi-media data are not suitable for real-time data without differentiating between data streams according to their priorities or reserving bandwidth due to its real-time property. Therefore, it is desirable to provide a method capable of supporting multi-priority transmission in the WDM network environment.

SUMMARY OF THE INVENTION

The object of the present invention is to provide a multi-priority media access control method, by which a multi-channel slotted ring network can transmit packets by packet priority.

To achieve the object, there is provided a multi-priority media access control method for a multi-channel slotted ring networks. The network has a plurality of nodes connected in a ring topology, a plurality of channels for transmitting data packets and control packets, and provides a plurality of slots that synchronously and circularly flow in one direction. Every control packet carries headers of slots of corresponding channels within a slot time and provides a priority value field corresponding to a slot in one channel. Each node has a plurality of queues and a stack for one channel. Each queue has a predefined high threshold and a predefined low threshold, and stores packets with the same priority. The multi-priority media access control method first sets the priority value fields of the control packets with priority values to identify a priority for each slot. Then, each node depends on the priority value fields of control packets to select a queue at every slot time in such a manner that the priority of a slot is the smallest priority of packets that can be carried by the slot.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
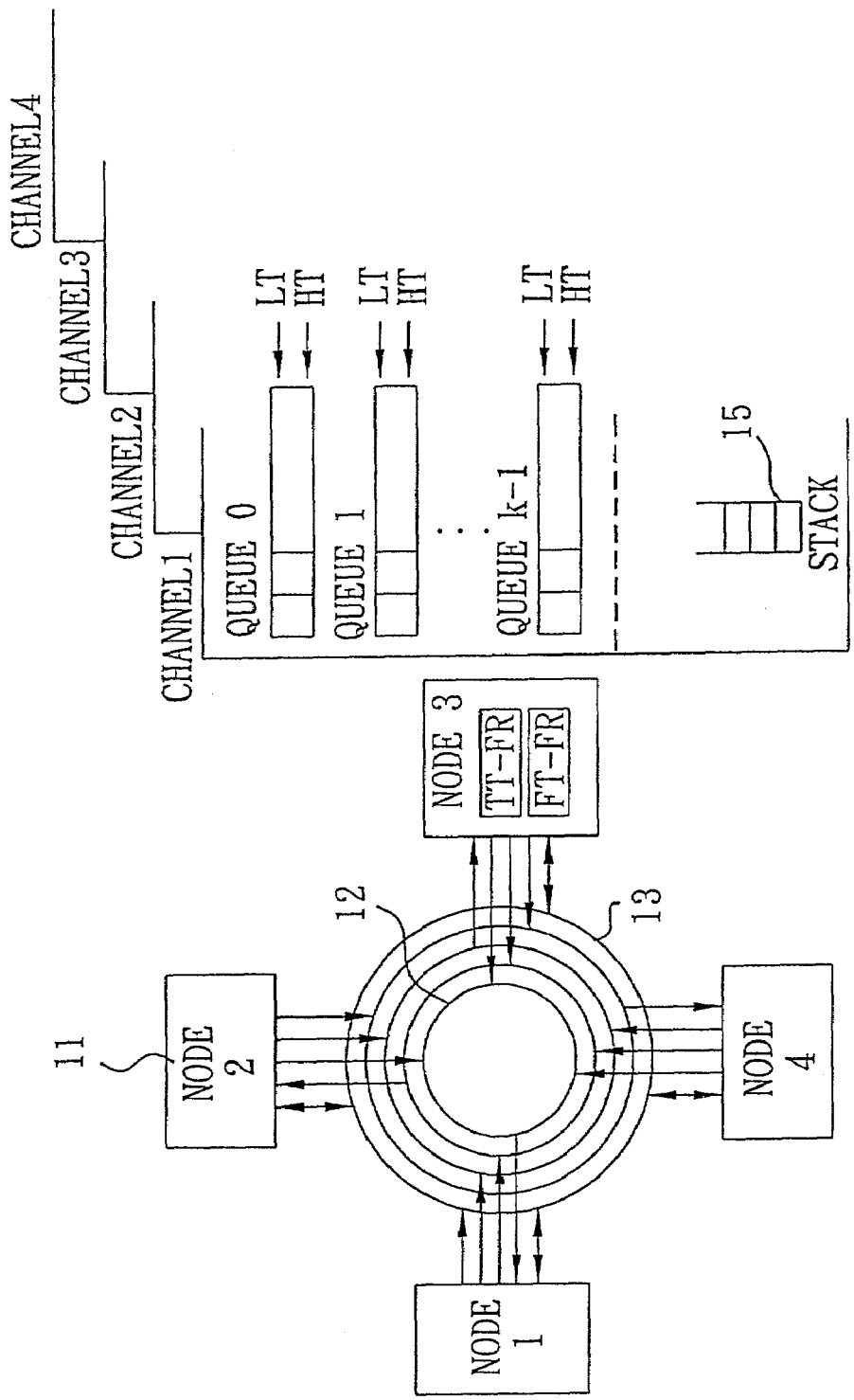
FIG. 1 shows a multi-channel slotted ring network for performing the multi-priority media access control method in accordance with the present invention.
Figure 2:
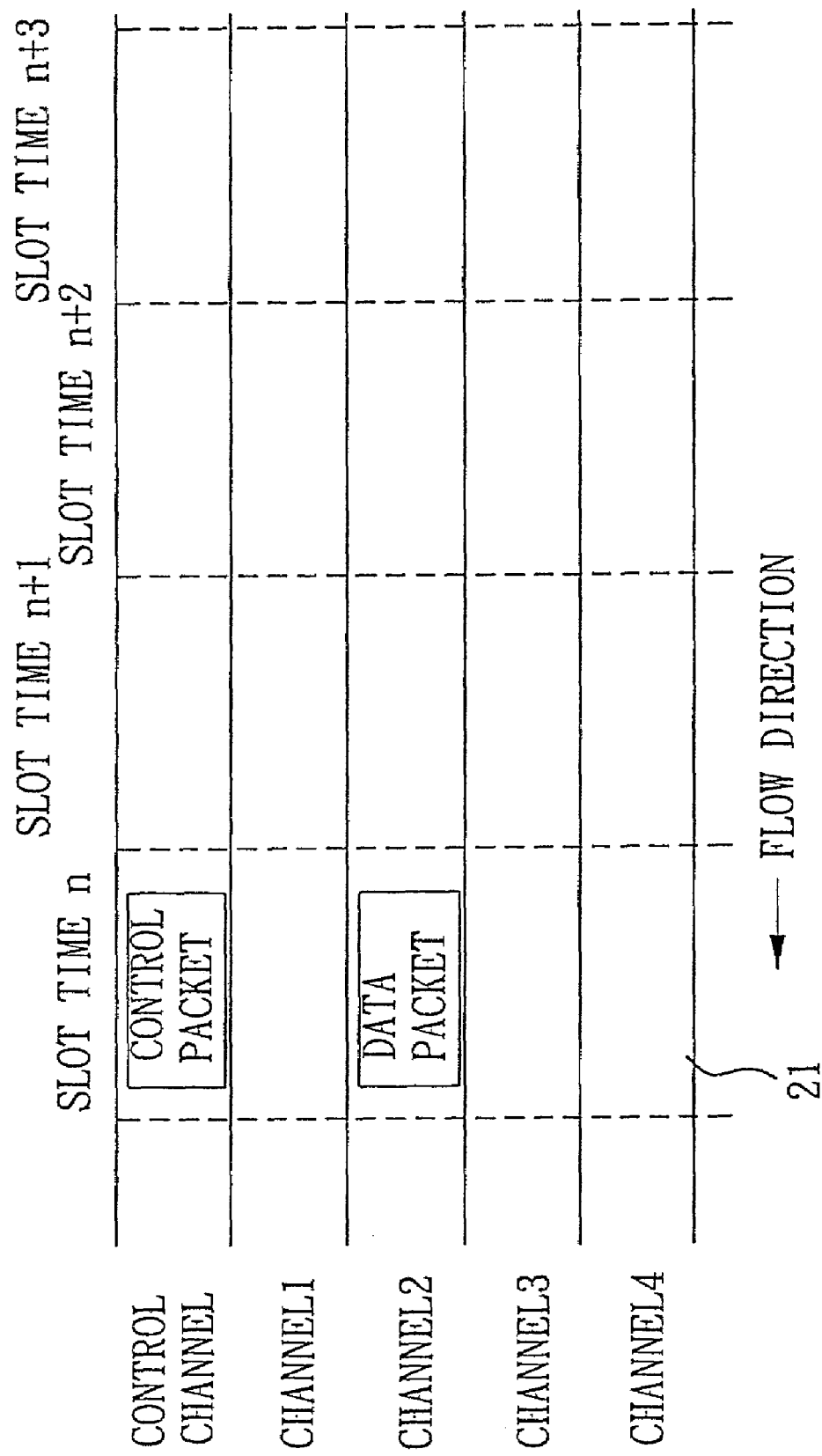
FIG. 2 shows the packet flowing structure of the multi-channel slotted ring network.

A WDM multi-channel slotted ring network is typically composed of M nodes connected in a ring topology and W+1 channels provided for each node to transmit or receive data and control information. FIG. 1 depicts an example of a multi-channel slotted ring network with four nodes 11, four data channels 12 (M=W=4) and one additional control channel 13. The data channels 12 are used to transmit data packets, and the control channel 13 is used to transmit control packets. Regardless of the data channels or the control channel, there are a constant number of fixed length slots 21 that synchronously and circularly flow in one direction in the network, as shown in FIG. 2. In this preferred embodiment, the control channel 13 is implemented as an individual channel. Alternatively, the control channel 13 may be implemented by several sub-channels. For example, each data channel 12 is provided with a sub-channel, and the combined sub-channels constitute the control channel 13.

It is assumed that the header of slots of all data channels 12 is carried on slots of the control channel 13. Every control packet carries the header of slots of all channels within a slot time. It is also assumed that a data packet exactly fits into the payload of a slot in all data channels 12. Furthermore, the header of a slot 21 and the slot 21 itself can be transmitted at the same slot time. Alternatively, the header can be transmitted before several slot times of the slot 21. Herein, it is assumed that the header of a slot 21 is transmitted at the same slot time with the slot 21.

In the network, a node 11 has one tunable transmitter and one fixed receiver (TT-FR transceiver) to transmit and receive data packets and is assigned a particular data channel 12 through which packets are received. For the control channel 13, a node is equipped with one additional fixed transmitter and receiver (FT-FR transceiver) to transmit and receive control packets.

The multi-priority media access control method for WDM multi-channel slotted ring networks in accordance with the present invention supports k priorities, and every node owns k queues corresponding to one transmittable data channel 12. Every queue stores packets with the same priority and processes packets in a First In First Out (FIFO) order for a data channel 12. At every slot time, each node designates a queue to transmit the head packet of the queue. To transmit a packet, a node 11 tunes its transmitter to the receiving channel of the destination node 11. The transmitted packet is sent along the ring and waits until the destination node 11 extracts it. When a node 11 tries to send a packet, it must defer the transmission whenever another packet appears in the same data channel 12 at the same slot time.

Figure 3:
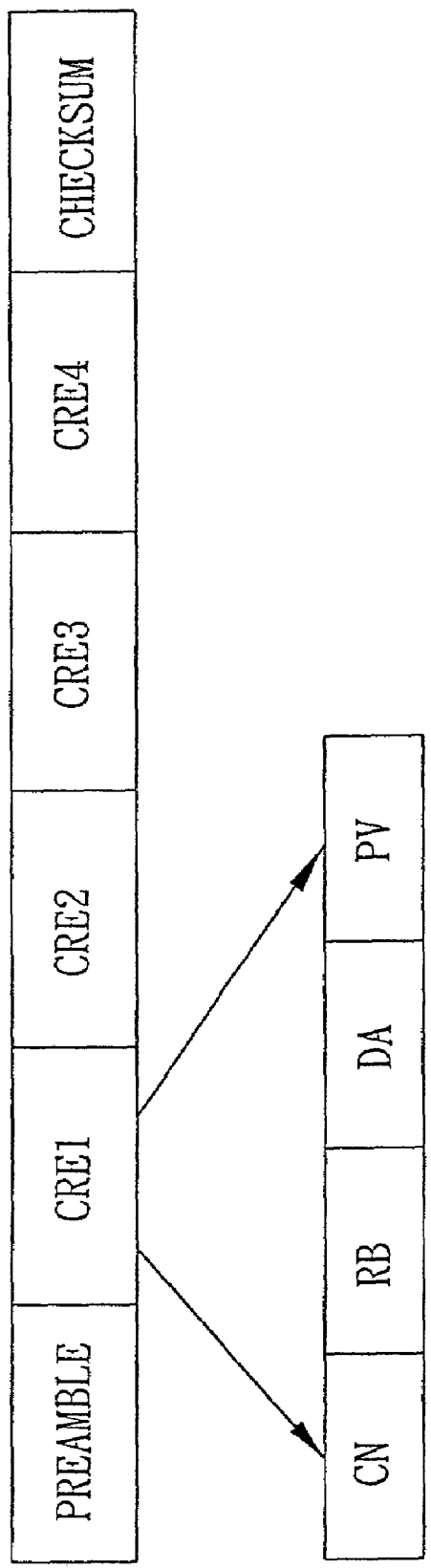
FIG. 3 shows the basic format of a control packet in accordance with the present method.

FIG. 3 presents the basic format of a control packet. The control packet consists of a preamble field, a checksum field and a number of Channel-Reservation Elements (CRE). The preamble field is used to represent the beginning of a control packet, and the checksum field is used to verify packet accuracy. The number of CREs equals the number of data channels 12. Basically, a CRE consists of a Channel Number field (CN), a Reservation Bit (RB), a Destination Address (DA) and a Priority Value (PV), as FIG. 3 shows. The CN is an identifier used to indicate the data channel 12 to which the CRE relates. Each CRE stores the header information of the slot 21 of the corresponding data channel 12 at the same slot time. Meanwhile, the RB serves to identify whether the related slot 21 is reserved or not. The DA stores the destination address of the packet transmitted at slot 21. The PV defines the transmission priority of the slot 21. The transmission priority of a slot 21 is the smallest priority of packets that can be carried by the slot 21. The PV field identifies the priorities of the corresponding slot 21.

As aforementioned, there are k priorities, 0 . . . k–1, supported in the network. It is assumed that zero is the lowest priority and k–1 is the highest priority. Therefore, as shown in FIG. 1, each node 11 has k queues for one data channel 12 and has a total of W×k queues. From the transmission protocol section, it can be found that nodes 11 depend on the PV fields of control packets to select their queue at every slot time.

In order to set CRE PV fields in every control packet, the nodes 11 will check the waiting time of every queue. The waiting time can be an inter-transmitting interval between neighboring packets of every queue, wherein the inter-transmitting interval of a queue is defined as the interval from the transmission moment of its last packet to the event of transmitting the packet itself, or a delayed time from the moment of determining packet transmission to the moment of starting packet transmission. In this embodiment, the waiting time is an inter-transmitting interval. Every node 11 has two thresholds of inter-transmitting time for every priority queue as the criterion of raising and lowering slot priority values. The two thresholds are a high threshold (HT) and a low threshold (LT), and HT is larger than or equal to LT.

Figure 4:
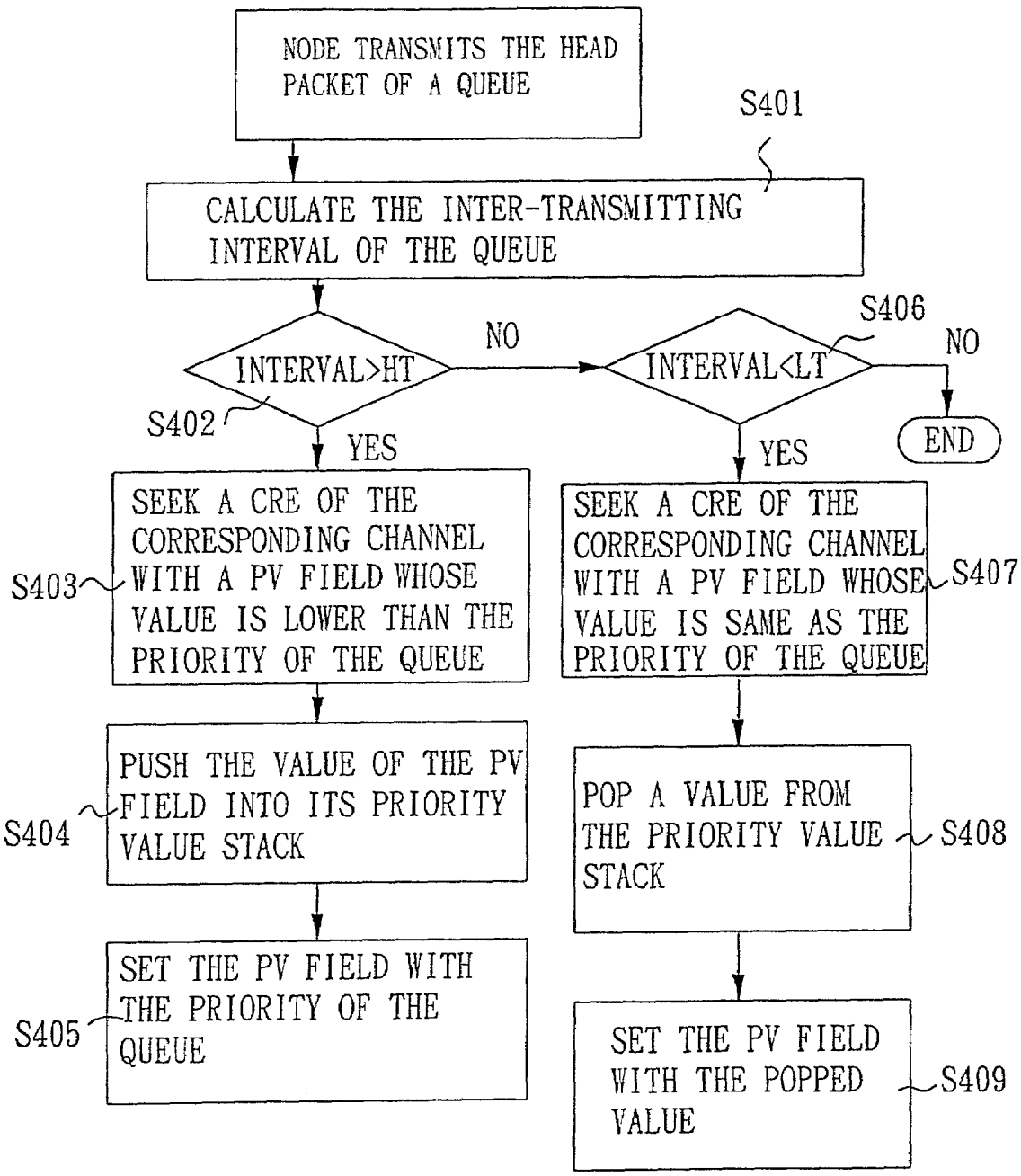
FIG. 4 is a flowchart on setting PV fields of CREs in every control packet in accordance with the present method.

With reference to FIG. 4, as a node 11 transmits the head packet of a queue, it will calculate the inter-transmitting interval of the queue (step S401). If the interval of a queue is larger than its HT (step S402), after the transmission slot time, the node 11 will seek a CRE of the corresponding data channel 12 with a PV field whose value is lower than the priority of the queue (step S403). If the CRE exists, the node 11 will push the current value of the PV field of the CRE into its priority value stack 15 (step S404) and set the field with the priority of the queue (step S405). On the contrary, if the interval of a queue is smaller than its LT (step S406), the node 11 will seek a CRE of the corresponding data channel 12 with a PV field whose value is the same as the priority of the queue (step S407). If the CRE exists, the node 11 will pop a value from the priority value stack 15 (step S408) and set the PV field of the CRE with the popped value (step S409).

In order to avoid setting consecutive slot priorities on the same data channel 12 and severely varying the inter-transmitting packet intervals, for a data channel 12, the nodes 11 recheck the inter-transmitting packet intervals for a queue only after setting the slot 21 priority on the corresponding queue channel.

In view of the foregoing, it is known that the present method modifies the header format of slots, which defines the slot priorities on ring networks and limits which packets can be transmitted through the slots. By cooperating with a designation scheme to assign the priority of slots based on two thresholds to raise and lower the priority of slots, the capability of transmitting multiple priority packets can be achieved.

Although the present invention has been explained in relation to its preferred embodiment, it is to be understood that many other possible modifications and variations can be made without departing from the spirit and scope of the invention as hereinafter claimed.

What is claimed is:

1. A multi-priority media access control method for a multi-channel slotted ring network having a plurality of nodes connected in a ring topology, a plurality of channels for transmitting data packets and control packets, and providing a plurality of slots that synchronously and circularly flow in one direction, every control packets carrying headers of slots of corresponding channels within a slot time and providing a priority value field corresponding to a slot in one channel, each node having a plurality of queues and a stack for one channel, each queue storing packets with the same priority and having a predefined high threshold and a predefined low threshold, the method comprising the steps of:

(A) setting the priority value fields of the control packets with priority values to identify a priority for each slot by:

(A1) calculating a waiting time of a queue when a node transmits a packet from the queue;

(A2) if the waiting time of the queue is larger than its high threshold, seeking a priority value field of the corresponding channel whose value is lower than the priority of the queue, pushing the value of the priority value field into its stack, and setting the priority value field with the priority of the queue; and (A3) if the waiting time of the queue is smaller than its low threshold, seeking a priority value field of the corresponding channel whose value is the same as the priority of the queue, popping a value from the stack, and setting the priority value field with the popped value; and (B) each node depending on the priority value fields of control packets to select a queue at every slot time in such a manner that the priority of a slot is the smallest priority of packets that can be carried by the slot.

2. The multi-priority media access control method as claimed in claim 1, wherein the high threshold is larger than or equal to the low threshold.

3. The multi-priority media access control method as claimed in claim 2, wherein the waiting time of a queue is an inter-transmitting interval from a transmission moment of its last packet to an event of transmitting the packet itself.

4. The multi-priority media access control method as claimed in claim 2, wherein the waiting time of a queue is a delay time from a moment of determining to transmit a packet to a moment of starting to transmit the packet.

5. The multi-priority media access control method as claimed in claim 2, wherein each node rechecks the waiting time of packets for a queue only after setting the priority of a slot on the corresponding channel of the queue.

6. The multi-priority media access control method as claimed in claim 2, wherein the channels include a plurality of data channels for transmitting the data packets and a control channel for transmitting the control packets.

7. The multi-priority media access control method as claimed in claim 6, wherein headers of slots of all data channels are carried on slots of the control channels, and every control packet carries the headers of slots of all channels within a slot time.

8. The multi-priority media access control method as claimed in claim 7, wherein the control packet consists of a preamble field, a checksum field and a plurality of channel-reservation elements, each storing header information of the slot of the corresponding data channel at the same slot time, and the priority value field is provided in the channel-reservation element.

* * * * *